United States Patent
Park

(10) Patent No.: US 9,057,644 B2
(45) Date of Patent: Jun. 16, 2015

(54) ILLUMINANCE AND PROXIMITY SENSOR

(71) Applicant: So Eun Park, Seoul (KR)

(72) Inventor: So Eun Park, Seoul (KR)

(73) Assignee: Dongbu HiTek Co., Ltd., Bucheon-si (KR)

( * ) Notice: Subject to any disclaimer, the term of this patent is extended or adjusted under 35 U.S.C. 154(b) by 214 days.

(21) Appl. No.: 13/765,321

(22) Filed: Feb. 12, 2013

(65) Prior Publication Data

US 2014/0131576 A1    May 15, 2014

(30) Foreign Application Priority Data

Nov. 12, 2012  (KR) .................. 10-2012-0127214

(51) Int. Cl.
| | | |
|---|---|---|
| *H01L 31/101* | (2006.01) | |
| *G01J 1/42* | (2006.01) | |
| *G01J 5/10* | (2006.01) | |
| *G01J 1/04* | (2006.01) | |
| *G01J 1/16* | (2006.01) | |

(52) U.S. Cl.
CPC .............. *G01J 5/10* (2013.01); *G01J 1/0492* (2013.01); *G01J 1/1626* (2013.01)

(58) Field of Classification Search
CPC ......... G01J 1/0492; G01J 1/1626; G01J 1/42; G01J 5/10
USPC .............. 250/338.1, 338.4, 339.01, 339.05
See application file for complete search history.

(56) References Cited

U.S. PATENT DOCUMENTS

| | | | |
|---|---|---|---|
| 8,269,172 B2 | 9/2012 | Skurnik | |
| 8,531,528 B2 | 9/2013 | Lee | |
| 8,564,580 B2 | 10/2013 | Sakai et al. | |
| 8,658,975 B2 | 2/2014 | Lee et al. | |
| 2009/0135167 A1 | 5/2009 | Sakai et al. | |
| 2010/0314543 A1 | 12/2010 | Lee et al. | |
| 2011/0042556 A1* | 2/2011 | Natsuaki | 250/226 |
| 2011/0193968 A1 | 8/2011 | Lee | |
| 2012/0074322 A1* | 3/2012 | Skurnik | 250/338.4 |
| 2013/0106813 A1* | 5/2013 | Hotelling et al. | 345/207 |

FOREIGN PATENT DOCUMENTS

| | | |
|---|---|---|
| KR | 20090054378 | 5/2009 |
| KR | 10-0927002 B1 | 11/2009 |
| KR | 10-2010-0132846 A | 7/2011 |

OTHER PUBLICATIONS

Eiji Sakai, et al., Espacenet Bibliographic Data: Abstract of KR20090054378, 2 pages, European Patent Office, http://worldwide.espacenet.com.

(Continued)

*Primary Examiner* — Mark R Gaworecki
(74) *Attorney, Agent, or Firm* — Andrew D. Fortney; Central California IP Group, P.C.

(57) ABSTRACT

An illuminance and proximity sensor includes a first sensing unit that senses infrared light and green light, and forwards a first sensing signal corresponding to a result of the sensing, a second sensing unit that filters visible light, senses the infrared light, and forwards a second sensing signal corresponding to a result of the sensing, and a control unit that produces an illuminance using a first difference value from subtracting the second sensing signal from the first sensing signal, and a proximity using a second difference value from subtracting the first difference value from the second sensing signal.

17 Claims, 4 Drawing Sheets

(56) References Cited

OTHER PUBLICATIONS

Abstract for KR Registration No. 1009270020000, Publication Date Nov. 9, 2009, Korean Intellectual Property Office, http://engpat.kipris.or.kr.

Abstract for KR Registration No. 1020100132846, Publication Date Dec. 20, 2010, Korean Intellectual Property Office, http://engpat.kipris.or.kr.

* cited by examiner

ILLUMINANCE AND PROXIMITY SENSOR

CROSS REFERENCE TO RELATED APPLICATION

This application claims the benefit of Korean Patent Application No. 10-2012-0127214, filed on Nov. 12, 2012, which is incorporated herein by reference as if fully set forth herein.

BACKGROUND OF THE DISCLOSURE

1. Field of the Disclosure

Embodiments relate to an illuminance and proximity sensor that senses an illuminance and a proximity of an object.

2. Discussion of the Related Art

An image sensor is a semiconductor device for converting an optical image into an electric signal. Among the types of image sensors, there are a CCD (Charge Coupled Device) type image sensor and a CMOS (Complementary Metal-Oxide-Silicon) type image sensor.

The image sensor may be incorporated into an apparatus having a camera mounted thereto, for example, a mobile phone, and the like. In general, such apparatus is provided not only with the image sensor, but also a proximity sensor for measuring a distance from the apparatus to a subject, and an illuminance sensor for measuring the illuminance or illuminance level of the external light.

For example, power consumption of a backlight unit in the mobile phone is adjusted, and/or activation of a touch sensor in the mobile phone is determined, according to the proximity measured by the proximity sensor. This can prevent the mobile phone from malfunctioning. And, the power consumption of the mobile phone can be reduced by adjusting the brightness of the display in the mobile phone according to the brightness of the external light, as measured by the illuminance sensor.

In general, since the illuminance sensor requires an IR cutoff filter to remove infrared rays, and the proximity sensor requires an IR pass filter that passes only infrared rays, it is not easy to include or integrate illuminance sensing and proximity sensing into or onto a single chip.

SUMMARY OF THE DISCLOSURE

Accordingly, the present invention is directed to an illuminance and proximity sensor.

An object of the present invention is to provide an illuminance and proximity sensor which can be embodied into or integrated onto one chip, and can reduce the chip size and production cost to enhance price competitiveness.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose(s) of the invention, as embodied and broadly described herein, an illuminance and proximity sensor can include a first sensing unit that senses infrared rays or light and a green color light, and forwards a first sensing signal corresponding to a result of the sensing (e.g., the sensed infrared rays or light and green light), a second sensing unit that cuts off or filters visible light, senses the infrared rays or light, and forwards a second sensing signal corresponding to a result of the sensing (e.g., the sensed visible light and infrared rays or light), and a control unit that produces an illuminance by using (e.g., from) a first difference value which is a result of subtracting the second sensing signal from the first sensing signal, and produces a proximity by using (e.g., from) a second difference value which is a result of subtracting the first difference value from the second sensing signal.

The first sensing unit may include a first lens, a first filter under the first lens that passes the green light and the infrared rays only, a first pixel under the first filter that senses the green light passing through the first filter, and a first infrared pixel under the first pixel that senses the infrared rays passing through the first filter.

The second sensing unit may include a second lens, a second filter under the second lens that cuts off or filters the visible light and passes the infrared rays, and a second infrared pixel under the second filter that senses the infrared ray passing through the second filter.

The second filter may have a structure comprising a red color filter on a blue color filter (e.g., in a stack).

The illuminance and proximity sensor may further include a second pixel between the second filter and the second infrared pixel.

Advantageous Effects

The present invention permits integrating the illuminance and proximity sensors into or onto one chip, and reduces the chip size and production cost to enhance price competitiveness.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle(s) of the disclosure. In the drawings.

DESCRIPTION OF SPECIFIC EMBODIMENTS

Figure 1:
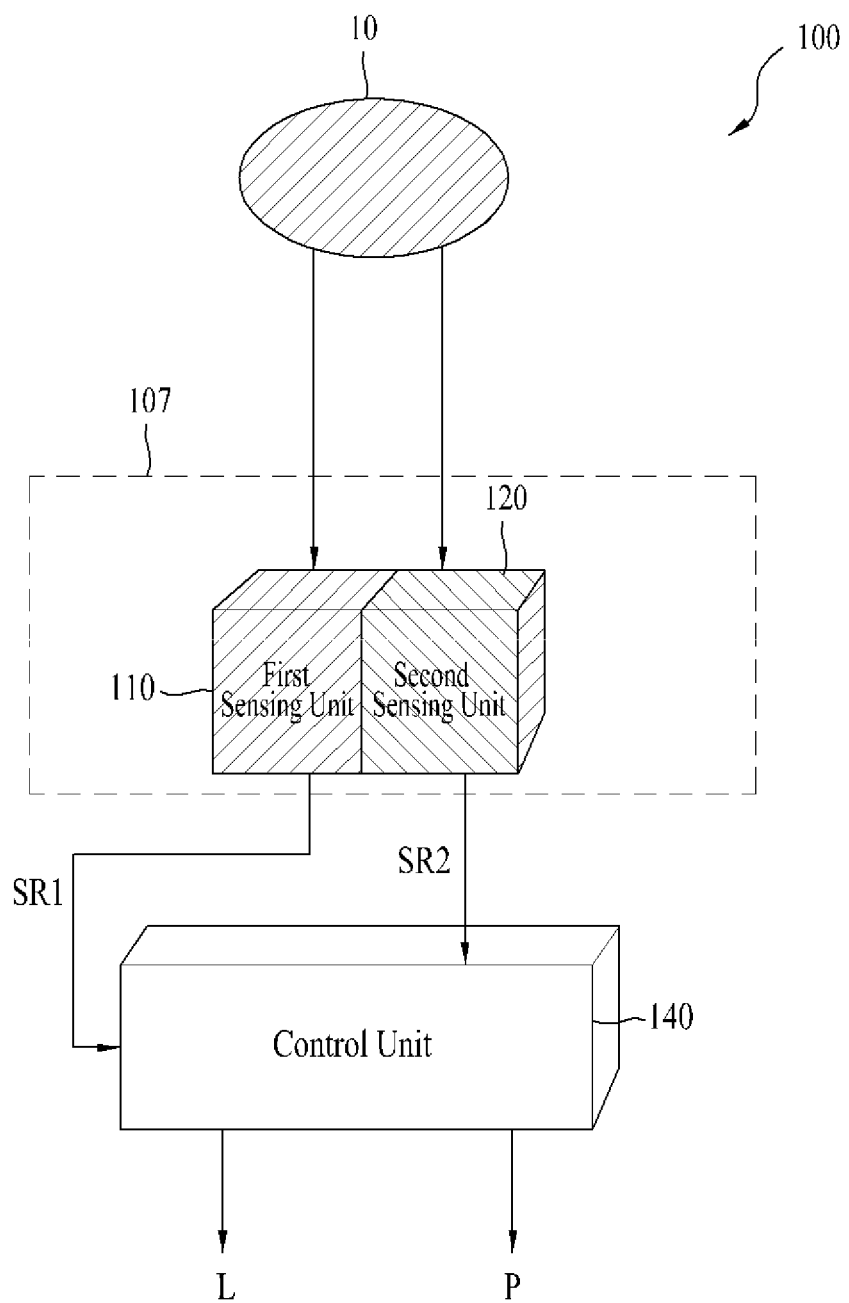
FIG. 1 is a block diagram of an illuminance and proximity sensor in accordance with one embodiment of the present invention.

Reference will now be made in detail to specific embodiments of the present invention, examples of which are illustrated in the accompanying drawings. In the description of various embodiments, if it is described that a layer or a film, a region, a pattern, or a structure is formed "on" or "under" a substrate, a layer or a film, a region, a pad, or a pattern, the "on" or "under" implies that the layer, the film, the region, the pattern, or the structure is formed "on" or "under" the substrate, the layer, the film, the region, the pad, or the pattern directly or indirectly, with one or more other substrates, layers, films, regions, pads, or patterns disposed therebetween. And, a reference to the "on" or "under" is the drawing.

A size in a drawing can be exaggerated, omitted or shown schematically for convenience and clarity of description. And, the size of an element may not be shown to scale perfectly. And, the same reference number refers to the same element(s) throughout the description of the drawings. An illuminance and proximity sensor of the present invention will be described with reference to the attached drawings.

Figure 2:
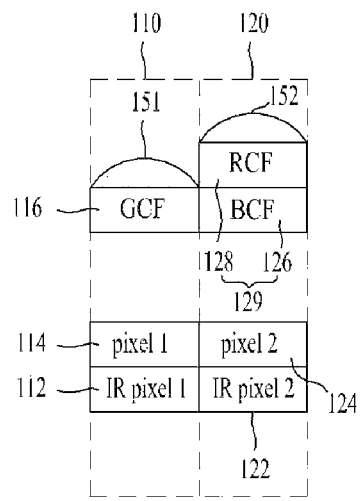
FIG. 2 is a diagram of an exemplary structure of the first and second sensing units in FIG. 1.

FIG. 1 illustrates a block diagram of an exemplary illuminance and proximity sensor 100 in accordance with an embodiment of the present invention, and FIG. 2 illustrates a diagram of an exemplary structure of the first and second sensing units 110 and 120 in FIG. 1. As shown in FIGS. 1 and 2, the illuminance and proximity sensor 100 includes a sensing unit 107 and a control unit 140.

The sensing unit 107 can measure the illuminance (e.g., of the environment) and the proximity (e.g., of the object to be imaged), and may include a first sensing unit 110 and a second sensing unit 120.

The first sensing unit 110 senses infrared rays or light and a first visible light of a particular wavelength or wavelength band, and forwards a first sensing signal SR1 corresponding to a result of the sensing (e.g., the sensed infrared light and visible light of the first wavelength or wavelength band). For example, the wavelength of infrared light that the first sensing unit 110 senses may be in the range of 800~1100 nm, and wavelength or wavelength band of the first visible light that is sensed by the first sensing unit 110 may be in the range of 500 nm~600 nm. The infrared rays incident on the first sensing unit 110 may be those reflected by a subject 10.

Referring to FIG. 2, the first sensing unit 110 may include a first lens 151, a first filter 116 under the first lens 151, a first pixel 114 (e.g., a first visible light pixel) under the first filter 116, and a first infrared pixel 112 under the first pixel 114.

The first lens 151 can focus incident light, and the first filter 116 allows green light and infrared light only to pass through.

The first pixel 114 can sense (or absorb) the green light passing through the first filter 116, and the first infrared pixel 112 can sense (or absorb) the infrared rays or light passing through the first filter 116. The first infrared pixel 112 and the first pixel 114 may comprise a PN junction and/or photodiode, in turn comprising first conduction type impurities (for example, N type impurities) injected or implanted into a second conduction type (for example, P type) semiconductor substrate (not shown).

The first filter 116 may be a green color filter.

If the light the first sensing unit 110 senses is a first sensed light, the first sensed light may be a combination of the infrared rays or light and the green light, and the first sensing signal SR1 may be a signal that the first sensing unit 110 forwards as a result of sensing the first sensed light.

The first sensing signal SR1 may be the superposition of a signal corresponding to sensing (or THE absorption of) (1) the infrared rays or light by the first infrared pixel 112 and a second signal corresponding to sensing (or the absorption of) the first visible light by the first pixel 114.

The second sensing unit 120 cuts off visible light and senses only infrared rays or light, and forwards a second sensing signal SR2 corresponding to a result of the sensing (e.g., the sensed infrared light). The infrared light incident on the second sensing unit 120 may be that reflected by the subject 10.

The second sensing unit 120 may include a second lens 152, a second filter 129 under the second lens 152, a second pixel 124 under the second filter 129, and a second infrared pixel 122 under the second pixel 124.

The second lens 152 can focus the incident light. The second filter 129 can cut off or filter visible light, and pass infrared rays or light only. The second infrared pixel 122 can sense the infrared rays or light passing through the second filter 129.

The second filter 129 may have a structure comprising, but not limited to, a red color filter 128 (which passes only red color light) on a blue color filter 126 (which passes only blue color light) (e.g., in a stack), and can therefore cut off visible light. For example, in another embodiment, the second filter 129 may comprise a vertical stack including a blue color filter, a red color filter and a green color filter, in any order.

If the light the second sensing unit 120 senses is a second sensed light, the second sensed light may be infrared rays or light, and the second sensing signal SR2 may be a signal forwarded by the second sensing unit 120 as a result of sensing the second sensed light.

The second sensing signal SR2 may be a third signal S3 corresponding to the infrared rays or light sensed (or absorbed) by the second infrared pixel 122.

The second infrared pixel 122 and the second pixel 124 may comprise a PN junction and/or photodiode comprising first conduction type impurities (for example, N type impurities) injected or implanted into a first conduction type (for example, P type) semiconductor substrate (not shown).

Though a quantity of the light the second pixel 124 senses is not so much, the photodiodes in the first pixel 114 and the second pixel 124 can be formed by the same fabrication process (for example, using an identical mask, an identical impurity concentration, and so on).

The first pixel 114 and the first infrared pixel 112 may be vertically aligned to the first filter 116, and the second pixel 124 and the second infrared pixel 122 may be vertically aligned to the second filter 129.

Figure 3:
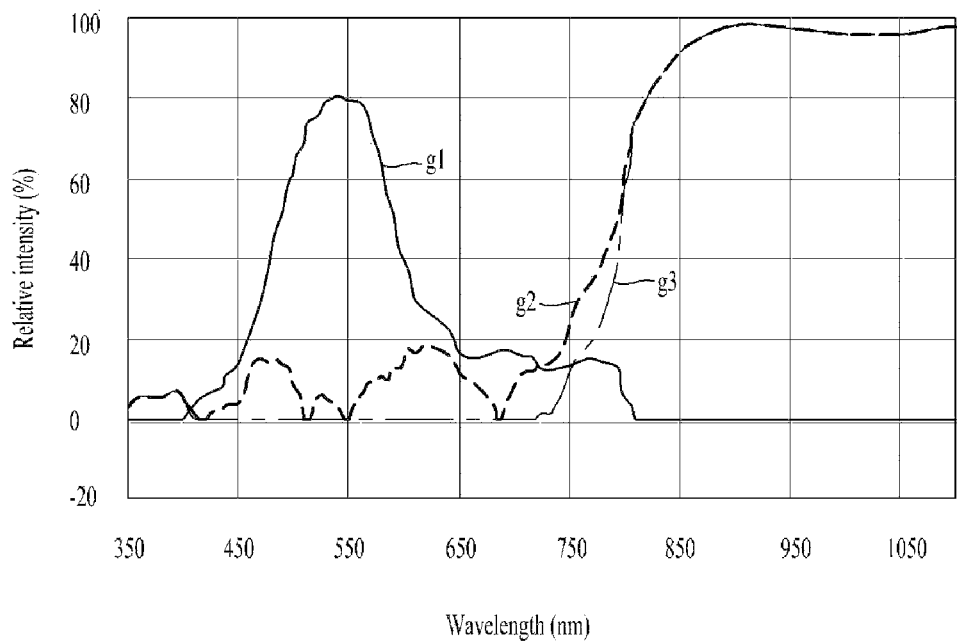
FIG. 3 is a graph showing an absorption ratio spectrum as a function of wavelength.

FIG. 3 illustrates a graph showing a wavelength vs. absorption ratio spectrum.

Referring to FIG. 3, g1 denotes a result of subtraction of the absorption ratio spectrum of the light (the second sensed light) that the second sensing unit 120 absorbs from the absorption ratio spectrum (or spectral characteristics) of the light (the first sensed light) that the first sensing unit 110 absorbs.

The g1 curve may have an absorption spectrum or absorption ratio spectrum having a peak value in the wavelength range of 500 nm~600 nm, at which the illuminance can be recognized or determined. That is, since the g1 curve can sense spectral characteristics adequately to sense visible light with an illuminance sensor, the illuminance sensor is possible and/or feasible as a result of using the g1 curve.

Referring back to FIG. 1, the control unit 140 may produce an illuminance (which is a brightness of the light incident from outside of the sensor) using the difference of the first sensing signal SR1 from the first sensing unit 110 and the second sensing signal SR2 from the second sensing unit 120.

For example, the control unit 140 may measure the illuminance L based on a first difference value SR1-SR2, which is a result of subtracting the second sensing signal SR2 from the first sensing signal SR1. If the first sensing unit 110 and the second sensing unit 120 are plural, an average of a plurality of the illuminances produced thus may be used as the illuminance.

Referring again to FIG. 3, the curve g2 denotes the absorption ratio spectrum of the light (the second sensed light) that the second sensing unit 120 absorbs. In order for the second sensing unit 120 to sense only infrared rays or light, the second sensed light can have no included visible light, but only infrared light. However, referring to curve g2, an absorption ratio spectrum value (which will be called "Noise" hereafter) can be present at wavelengths in the visible spectrum, such as 500 nm, 600 nm, 700 nm~800 nm, etc. This may come from failure of perfect cutoff or filtering of the light in the visible light range, with the second filter 129 having the red color filter 128 on the blue color filter 126. The embodiment suggests subtracting g1 from g2 for removal of the noise.

The curve g3 denotes a result (g2−g1) of subtracting the g1 curve from the g2 curve. For example, the g3 curve may be a further result of the change of the negative (−) portion of the result (g2−g1) to 0. In other words, the g3 curve has a value of zero (0) if the subtraction result is negative. This is for forcing the absorption ratio of bands other than the infrared band to 0.

Since the g3 curve has an absorption spectrum only at wavelengths higher than about 750 nm or 800 nm, proximity of the subject 10 (FIG. 1) can be measured by using the g3 curve or value.

The control unit 140 can produce the proximity P of the subject 10 by using the spectral characteristics of the g3 curve. The control unit 140 can produce the proximity P of the subject 10 by using the second sensing signal SR2 and the first difference value SR1−SR2 of the first sensing signal SR1 and the second sensing signal SR1.

For example, the control unit 140 can produce the proximity P according to a second difference value SR2−(SR1−SR2) which is a result of subtracting the first difference value SR1−SR2 from the second sensing signal SR2. The result SR2−(SR1−SR2) may vary with the proximity to the subject 10. As described before, since the noise is removed, even if the second filter 129 having the red color filter 128 on the blue color filter 126 is used, the embodiment measures proximity accurately.

Since the embodiment permits measurement of both the illuminance and the proximity with the first sensing unit 110 and the second sensing unit 120, both the illuminance sensor and the proximity sensor can be integrated into or onto one chip simultaneously, enabling reduction of the chip size and the production cost, to enhance price competitiveness.

And, since the combined illuminance and proximity sensor of the embodiment has a structure in which the first and second pixels 114 and 124 (for visible light) and the first and second infrared pixels 112 and 122 in the first sensing unit 110 and the second sensing unit 120 are arranged vertically in series, the first and second pixels 114 and 124 and the first and second infrared pixels 112 and 122 can be formed simultaneously (e.g., at the same time) by using the same ion injection or implantation mask, rather than individual ion injection/implantation masks.

Figure 4:
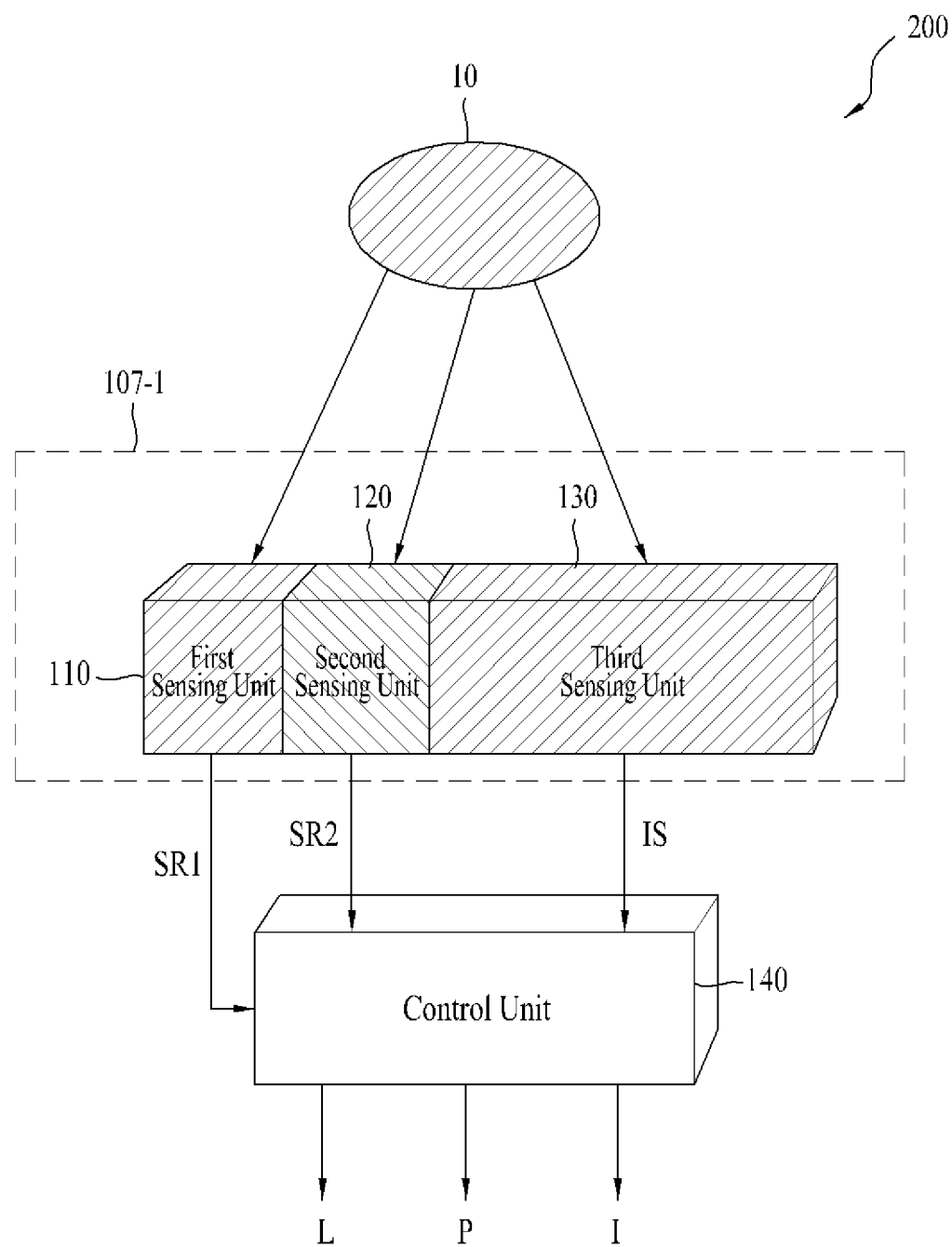
FIG. 4 is a block diagram of an exemplary image sensor in accordance with another embodiment.
Figure 5:
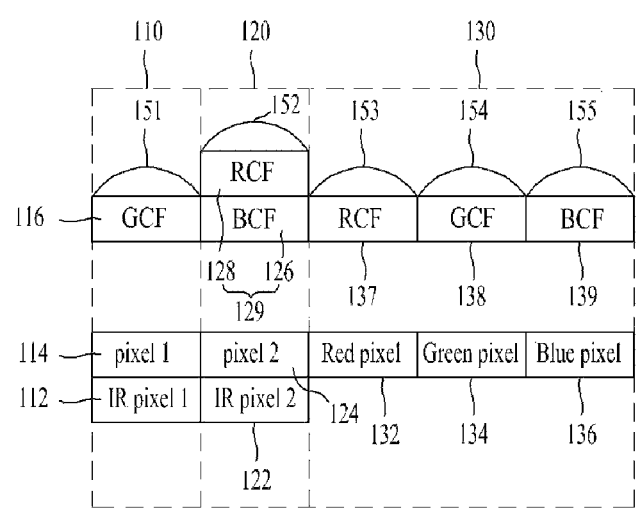
FIG. 5 is a diagram of exemplary structures of the sensing units in the image sensor of FIG. 4.

FIG. 4 illustrates a block diagram of an exemplary image sensor in accordance with another embodiment, and FIG. 5 illustrates a diagram of exemplary structures for the sensing units in FIG. 4.

Referring to FIGS. 4 and 5, the image sensor 200 may include a sensing unit 107-1 and a control unit 140, and the sensing unit 107-1 may comprise the sensing unit 107 in FIG. 1 with a third sensing unit 130 added thereto.

The third sensing unit 130 can sense an image of the subject 10. The third sensing unit 130 may include third to fifth lenses 153, 154, and 155 that focus incident light, a red color filter 137 that passes red color light only, a green color filter 138 that passes green color light only, a blue color filter 139 that passes blue light only, a red pixel 132 that senses the red color light from the red color filter 137, a green pixel 134 that senses the green color light from the green color filter 138, and a blue pixel 136 that senses the blue color light from the blue color filter 139. For example, the green color light may have a wavelength of 500 nm~600 nm, the red color light may have a wavelength of 610 nm~660 nm, and the blue color light may have a wavelength of 350 nm~450 nm.

The third sensing unit 130 may forward an image signal SI from the red pixel 132, the green pixel 134 and the blue pixel 136 (e.g., according to a result of an image sensing operation).

The control unit 140 may obtain image information on the subject 10 based on the image signal SI from the third sensing unit 130.

Characteristics, structures, effects, and so on described in the above embodiments are included in at least one of the embodiments of the present invention, but are not limited to only one embodiment invariably. Furthermore, it is apparent that the features, the structures, the effects, and so on described in the embodiments can be combined, or modified with other embodiments by persons skilled in this field of art. Therefore, it is understood that such combination and modification is included within the scope of the present invention.

What is claimed is:

1. An illuminance and proximity sensor comprising:
a first sensing unit that senses infrared rays or light and light of a first visible color, and forwards a first sensing signal corresponding to a result of the sensing;
a second sensing unit that cuts off or filters visible light, senses the infrared rays or light, and forwards a second sensing signal corresponding to a result of the sensing; and
a control unit that produces an illuminance using a first difference value which is a result of subtracting the second sensing signal from the first sensing signal, and produces a proximity using a second difference value which is a result of subtracting the first difference value from the second sensing signal.

2. The illuminance and proximity sensor as claimed in claim 1, wherein the light of the first visible color is green light.

3. The illuminance and proximity sensor as claimed in claim 1, wherein the first sensing signal corresponds to the sensed infrared rays or light and the light of the first visible color.

4. The illuminance and proximity sensor as claimed in claim 3, wherein the second sensing signal corresponds to the sensed infrared rays or light.

5. The illuminance and proximity sensor as claimed in claim 1, wherein the second sensing signal corresponds to the sensed infrared rays or light.

6. The illuminance and proximity sensor as claimed in claim 1, wherein the first sensing unit includes:
a first lens, and
a first filter under the first lens that passes only the light of the first visible color and the infrared rays or light.

7. The illuminance and proximity sensor as claimed in claim 6, wherein the light of the first visible color is green light.

8. The illuminance and proximity sensor as claimed in claim 7, wherein the first sensing unit further includes:
a first pixel under the first filter that senses the green color light passing through the first filter, and
a first infrared pixel under the first pixel that senses the infrared rays or light passing through the first filter.

9. The illuminance and proximity sensor as claimed in claim 8, wherein the second sensing unit includes:
a second lens, and a second filter under the second lens that cuts off or filters visible light and passes the infrared rays or light.

10. The illuminance and proximity sensor as claimed in claim 9, further comprising a second pixel between the second filter and a second infrared pixel.

11. The illuminance and proximity sensor as claimed in claim 10, wherein the first and second pixels are formed by a same process.

12. The illuminance and proximity sensor as claimed in claim 11, wherein the first and second infrared pixels are formed simultaneously.

13. The illuminance and proximity sensor as claimed in claim 6, wherein the second sensing unit includes:
a second lens, and
a second filter under the second lens that cuts off or filters visible light and passes the infrared rays or light.

14. The illuminance and proximity sensor as claimed in claim 13, wherein the second sensing unit includes:
an infrared pixel under the second filter that senses the infrared rays or light passing through the second filter.

15. The illuminance and proximity sensor as claimed in claim 14, wherein the second filter comprises a red color filter and a blue color filter.

16. The illuminance and proximity sensor as claimed in claim 14, further comprising a second pixel between the second filter and the infrared pixel.

17. The illuminance and proximity sensor as claimed in claim 1, wherein the first and second sensing units and the control unit are integrated onto a same chip.

* * * * *